(12) United States Patent
Lamb et al.

(10) Patent No.: US 11,239,780 B1
(45) Date of Patent: Feb. 1, 2022

(54) ITERATIVE FLUX IDENTIFICATION

(71) Applicant: Rockwell Automation Technologies, Inc., Mayfield Heights, OH (US)

(72) Inventors: Jacob Lamb, Mequon, WI (US); Bing Li, Mequon, WI (US); Brian Seibel, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/031,359

(22) Filed: Sep. 24, 2020

(51) Int. Cl.
*H02P 21/14* (2016.01)
(52) U.S. Cl.
CPC .................. *H02P 21/141* (2013.01)
(58) Field of Classification Search
CPC ........ H02P 21/141; H02P 21/26; H02P 21/28; H02P 27/12
See application file for complete search history.

(56) References Cited

U.S. PATENT DOCUMENTS

| | | | | |
|---|---|---|---|---|
| 4,670,696 | A * | 6/1987 | Byrne | H02K 19/103 310/168 |
| 10,686,393 | B2 * | 6/2020 | Wang | H02P 21/141 |
| 2008/0129243 | A1 * | 6/2008 | Nashiki | H02K 1/246 318/701 |
| 2008/0191656 | A1 * | 8/2008 | Satake | B60L 15/2045 318/722 |
| 2012/0123715 | A1 * | 5/2012 | Eskola | G01R 31/34 702/65 |
| 2015/0222215 | A1 * | 8/2015 | Ishida | H02P 21/10 318/400.02 |
| 2015/0381081 | A1 * | 12/2015 | Bhangu | H02P 21/0089 318/400.05 |
| 2019/0229665 | A1 * | 7/2019 | Kobayashi | H02P 29/60 |

\* cited by examiner

*Primary Examiner* — Bickey Dhakal
(74) *Attorney, Agent, or Firm* — Kunzler Bean & Adamson; Scott D. Thorpe

(57) ABSTRACT

For flux map identification, a method applies an initial voltage to a motor. The motor is a salient motor. The method generates a flux map for the motor. The method iteratively applies a variable voltage to the motor. The variable voltage includes a constant current change calculated from the flux map. The method iteratively modifies the flux map.

20 Claims, 13 Drawing Sheets

US 11,239,780 B1

ITERATIVE FLUX IDENTIFICATION

BACKGROUND INFORMATION

The subject matter disclosed herein relates to flux identification.

BRIEF DESCRIPTION

A method for flux map identification is disclosed. The method applies an initial voltage to a motor. The motor is a salient motor. The method generates a flux map for the motor. The method iteratively applies a variable voltage to the motor. The variable voltage comprises a constant current change calculated from the flux map. The method iteratively modifies the flux map.

An apparatus for flux map identification is disclosed. The apparatus includes a processor and a memory storing code executable by the processor. The processor applies an initial voltage to a motor. The motor is a salient motor. The processor generates a flux map for the motor. The processor iteratively applies a variable voltage to the motor. The variable voltage comprises a constant current change calculated from the flux map. The processor iteratively modifies the flux map.

A computer program product for flux map identification is also disclosed. A processor applies an initial voltage to a motor. The motor is a salient motor. The processor generates a flux map for the motor. The processor iteratively applies a variable voltage to the motor. The variable voltage comprises a constant current change calculated from the flux map. The processor iteratively modifies the flux map.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
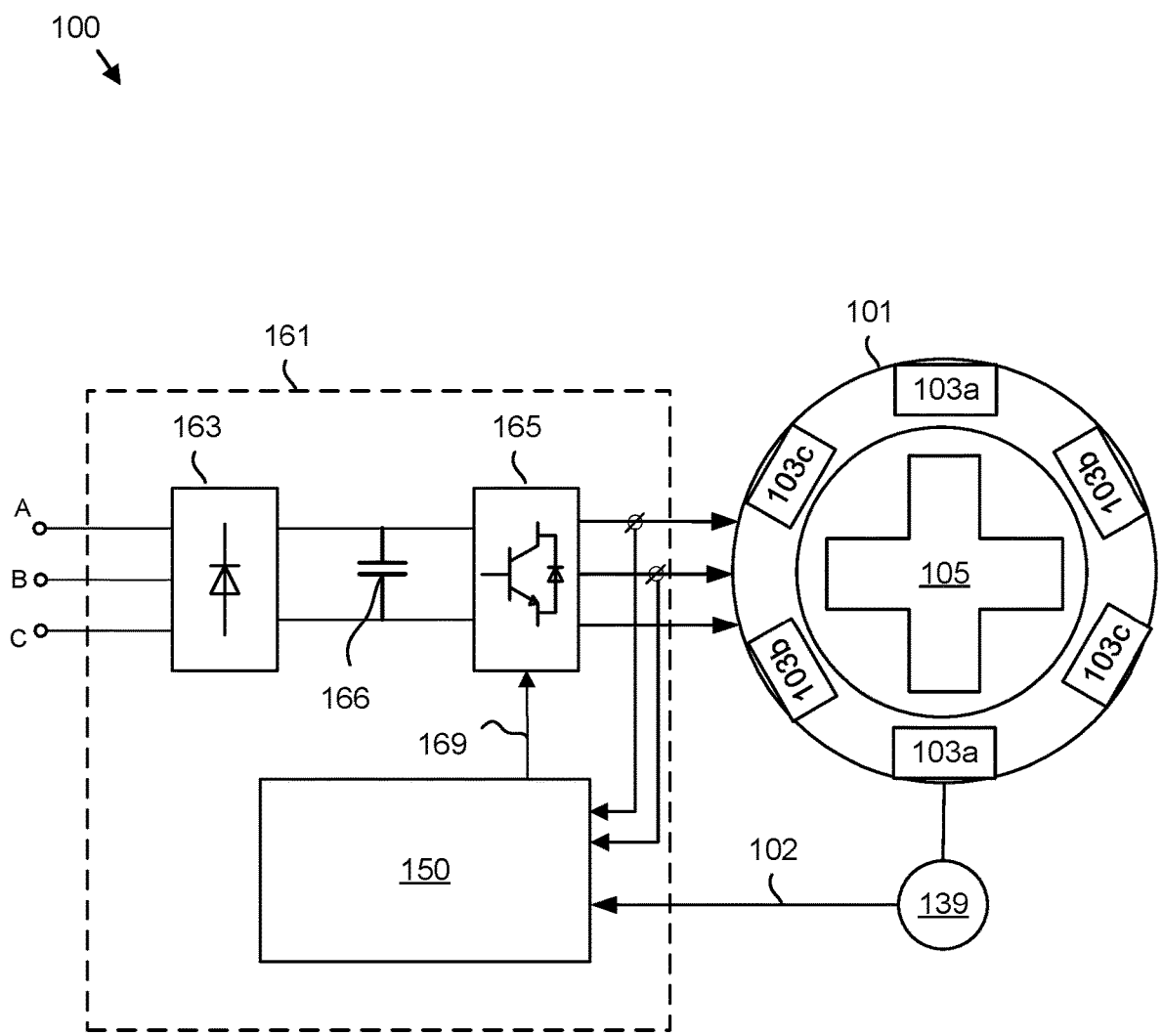
FIG. 1A is a schematic block diagram of motor system according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1A is a schematic block diagram of motor system 100. The system 100 includes a motor 101 and a motor drive 161. The motor 101 may be a salient motor 101.

Figure 4:
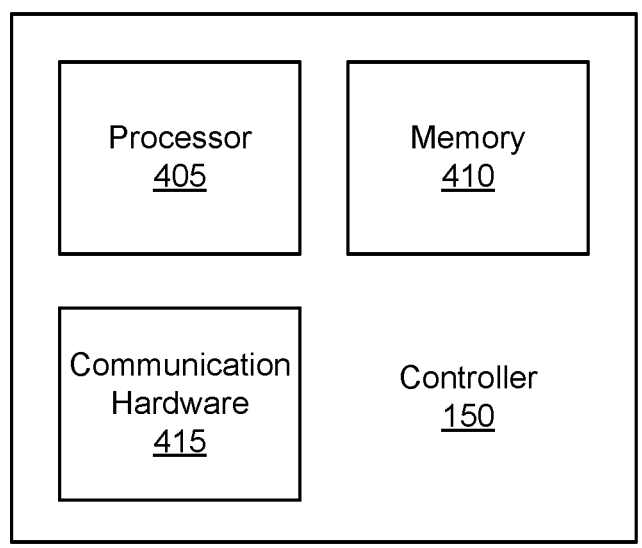
FIG. 4 is a schematic block diagram of a controller according to an embodiment.

The motor 101 may be controlled by the motor drive 161. In the depicted embodiment, the motor drive 161 includes a rectifier and/or converter 163, referred to hereafter as a rectifier 163, an inverter 165, a bus capacitor 166, and a controller 150. The controller 150 may include a processor as shown in FIG. 4. The controller 150 may produce the gate signals 169 to control the inverter 165, and therefore control the Motor 101. The system 100 may include an encoder 139 that generates a position signal 102. The position signal 102 is used accurately control the motor 101.

In the depicted embodiment, the motor 101 includes a rotor 105 and a plurality of coils 103a-c. The motor drive 161 may direct electric currents through the coils 103a-c to generate a motor flux that drives the rotor 105.

The motor drive 161 may control the motor 101 to generate torque at a specified angular velocity. The motor drive 161 may be required to control the motor 101 within a narrow range of angular velocities for a variety of loads. In a certain embodiment, at least a portion of the motor drive 161 comprise one or more of hardware and executable code, the executable code stored on one or more computer readable storage media.

Figure 1B:
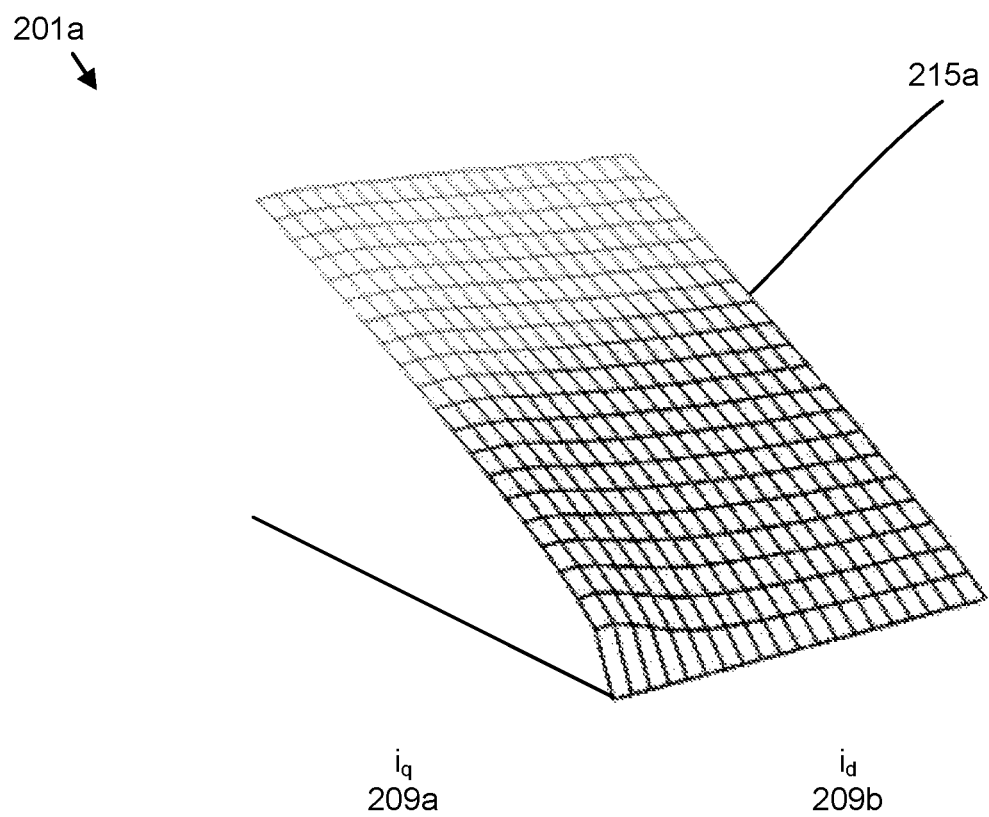
FIG. 1B is a graph of a Q-axis flux map according to an embodiment.

FIG. 1B is a graph of a Q-axis flux map 201a. The flux map 201a shows Q-axis flux $\lambda_q$ 215a measured in Volt seconds (Vs) for Q-axis current $i_q$ 209a and D-axis current $i_d$ 209b in the rotor 105 of the motor 101. In one embodiment, as inductance changes with flux and current L=$\Delta\lambda/\Delta i$, for known values of current i, the flux map 201 is equivalent to an inductance map. The flux map 201a may be used to determine the inductance for controlling the motor 101. For example, the flux map 201a may be used for high performance control, torque calculation, determining current regulator gains, and determining Maximum Torque Per Ampere (MTPA). A flux 215 and/or inductance may be determined for a given Q-axis current $i_q$ 209a and D-axis current $i_d$ 209b from the map 201a.

Figure 1C:
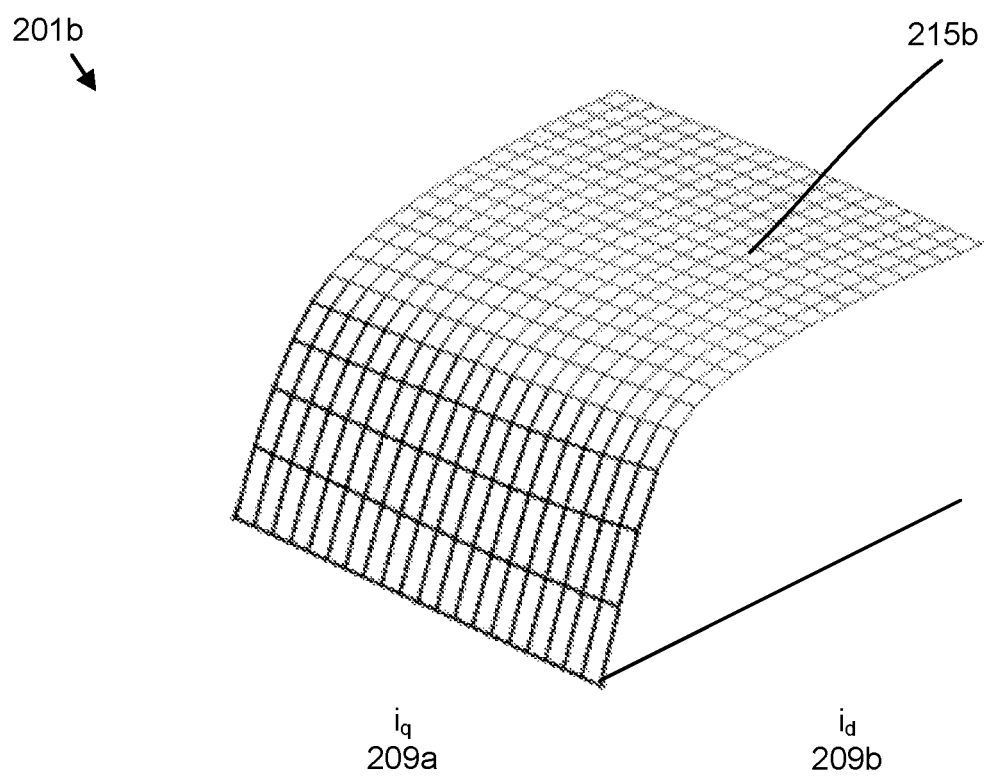
FIG. 1C is a graph of a D-axis flux map according to an embodiment.

FIG. 1C is a graph of a D-axis flux map 201b. The flux map 201b shows D-axis flux $\lambda_d$ 215b measured in Volt seconds (Vs) for Q-axis current $i_q$ 209a and D-axis current $i_d$ 209b in the rotor 105 of the motor 101. In one embodiment, as inductance changes with flux and current L=$\Delta\lambda/\Delta i$, for known values of current i, the flux map 201 is equivalent to an inductance map. The flux map 201b may be used to determine the inductance for controlling the motor 101. A flux 215 and/or inductance may be determined for a given Q-axis current $i_q$ 209a and D-axis current $i_d$ 209b from the map 201b.

Figure 2:
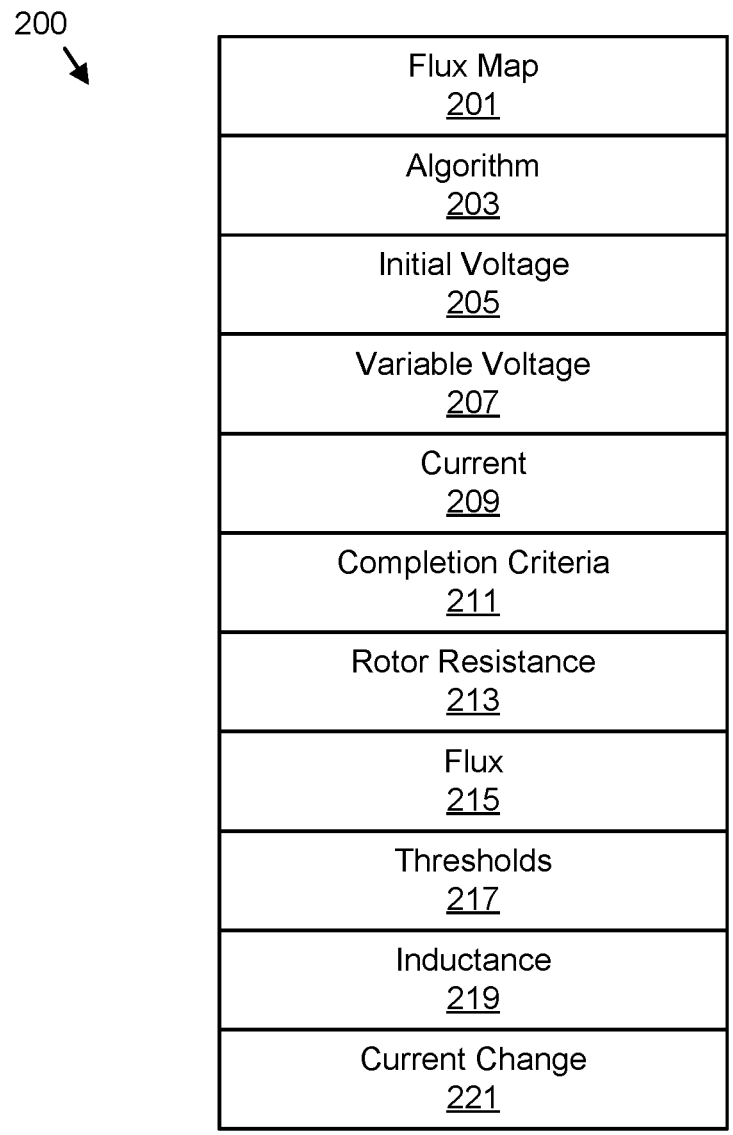
FIG. 2 is a schematic block diagram of flux data according to an embodiment.

FIG. 2 is a schematic block diagram of flux data 200. The flux data 200 may be used to identify the flux of the rotor 105 of the motor 101. The flux data 200 may be organized as a data structure in a memory. In the depicted embodiment, the flux data 200 includes the flux map 201, an algorithm 203, an initial voltage 205, a variable voltage 207, the current 209, completion criteria 211, a rotor resistance 213, the flux 215, thresholds 217, an inductance 219, and a current change 221.

The flux map 201 may record D-axis flux 215b and/or Q-axis flux 215a in the rotor 105 for a plurality of Q-axis currents $i_q$ 209a and D-axis currents $i_d$ 209b. In one embodiment, the flux map 201 is recorded as a three-dimensional array. FIGS. 1B-C illustrate embodiments of flux maps 201.

The algorithm 203 may be used to control the motor 101. The algorithm 203 may be selected from the group consisting of open-loop position tracking, current regulator tuning, and torque calculation.

The open-loop position tracking algorithm may require the flux map 201. In particular, voltage equations, which require motor parameter knowledge, are typically used in open-loop position tracking. For a machine with no permanent magnets, the steady-state voltage equations are given by Equations 1 and 2, wherein Rs is a stator resistance, We is a voltage frequency, $\lambda_d$ is a D-axis flux 215b, $\lambda_q$ is a Q-axis flux 215a, $L_q$ is a Q-axis inductance 219a, La is a D-axis inductance 219b, $i_q$ is the Q-axis currents 209a, and $i_d$ is the D-axis current 209b.

$$v_d = R_s i_d - \omega_e \lambda_q = R_s i_d - \omega_e L_q i_q \quad \text{Equation 1}$$

$$v_q = R_s i_q - \omega_e \lambda_d = R_s i_q - \omega_e L_d i_d \quad \text{Equation 2}$$

Current regulator tuning may require flux map information. This is because pole cancellation implementation utilizes the motor transfer function, which requires motor parameter knowledge.

Torque calculation may require the flux map 201, particularly at low speeds. This is because torque τ for the motor 101 is calculated using Equation 3, where $P_P$ is a number of pole pairs. Flux values are difficult to determine at low speeds without a flux map 201.

$$\tau = \frac{3}{2} * P_P(i_q \lambda_d - i_d \lambda_q) \quad \text{Equation 3}$$

In addition, offline calculation of a Maximum Torque Per Amp (MTPA) trajectory may require the flux map 201 since torque calculation methods may employ the flux map 201.

The initial voltage 205 specifies a voltage and/or voltage profile that is applied to the motor 101. The initial voltage 205 may be used to generate an initial flux map 201 for the rotor 105. The initial flux map 201 may be used to determine the variable voltage 207. The variable voltage 207 may be iteratively applied to the motor 101. In one embodiment, the variable voltage 207 comprises a constant current change of the current 209 calculated from the flux map 201. The constant current change may be a specified constant change in current 209 with respect to time.

The current 209 records and/or specifies the current for the motor 101. The current 209 may include a Q-axis current 209a and/or a D-axis current 209b. The rotor resistance 213 records and/or specifies a resistance of the rotor 105. The rotor resistance 213 may be measured and/or retrieved from the datasheet.

The variable voltage 207 may be iteratively determined and applied to the motor 101. In addition, the flux map 201 may be iteratively modified until the completion criteria 211 is satisfied. The completion criteria 211 may be selected from the group consisting of a convergence of flux map values and a specified number of iterations. For example, a previous flux map 201 and a subsequent flux map 201 may each record of flux 215a-b for a given Q-axis current $i_q$ 209a and a given D-axis current $i_d$ 209b. If the difference between the flux 215 for each Q-axis current $i_q$ 209a and D-axis current $i_d$ 209b pair in the previous flux map 201 and the subsequent flux map 201 is less than a flux threshold of the thresholds 217, the flux map values may be determined to have converged, satisfying the completion criteria 211.

In one embodiment, the completion criteria 211 is satisfied after a specified number of iterations. For example, the thresholds 217 may record that 20 iterations are required to satisfy the completion criteria 211. The specified number of iterations may be in the range of 2 to 25 iterations.

The flux 215 may record the flux 215 of the rotor 105, including a Q-axis flux 215a and a D-axis flux 215b. In addition, the flux data 200 may record an inductance 219 of the rotor 105, including a Q-axis inductance 219a and a D-axis inductance 219b. The thresholds 217 may record one or more thresholds.

The current change 221 may specify a change in the current 209 over a time interval. The current change 221 may be constant. The current change 221 may be used to determine the variable voltage 207 as will be described hereafter.

Figure 3A:
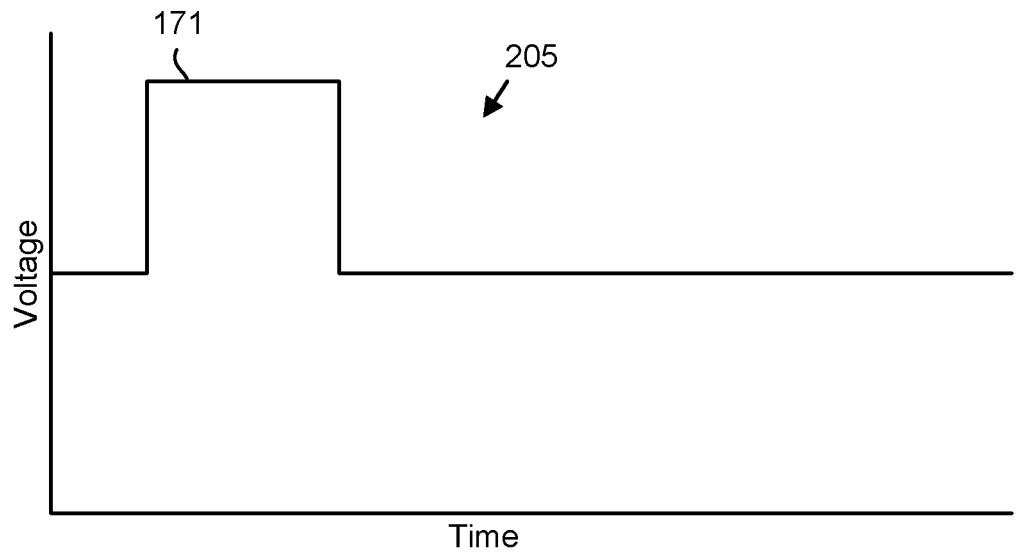
FIG. 3A is a graph of an initial voltage according to an embodiment.

FIG. 3A is a graph of an initial voltage 205. The initial voltage 205 may be applied to the motor 101 to generate an initial flux map 201 for the rotor 105. In the depicted embodiment, the initial voltage 205 comprises at least one pulse 171. In addition, the initial voltage 205 and/or pulse 171 has a constant voltage. For example, the initial voltage 205 may be applied to the motor 101 and the current 209 may be measured. The flux 215 for the flux map 201 may be calculated as will be described hereafter.

Figure 3B:
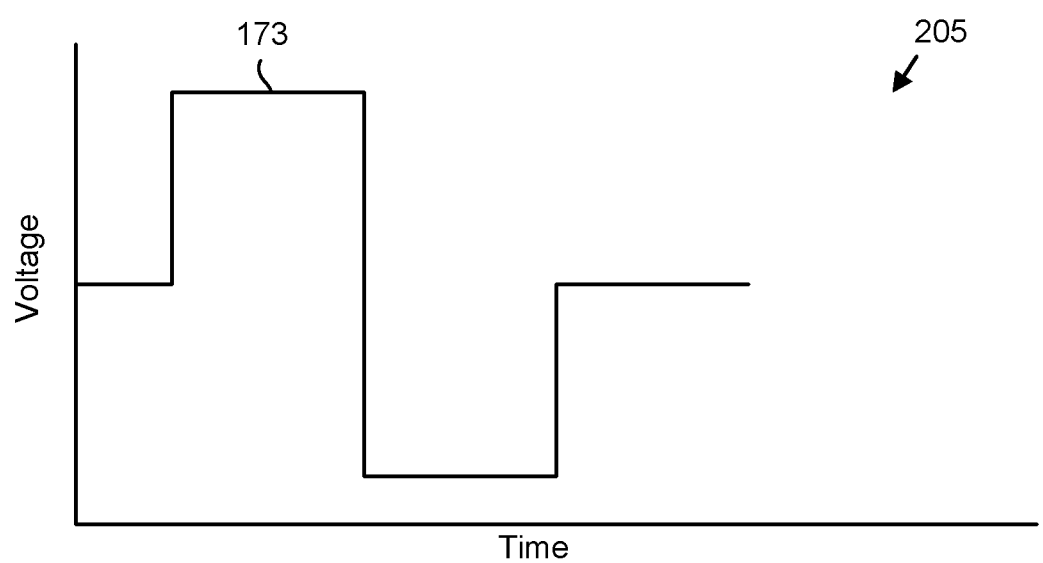
FIG. 3B is a graph of an initial voltage according to an alternate embodiment.

FIG. 3B is a graph of the initial voltage 205. In the depicted embodiment, the initial voltage 205 comprises at least one hysteresis cycle 173. In addition, each phase of the hysteresis cycle 173 has a constant voltage. The initial voltage 205 may be applied to the motor 101 to generate the initial flux map 201.

Figure 3C:
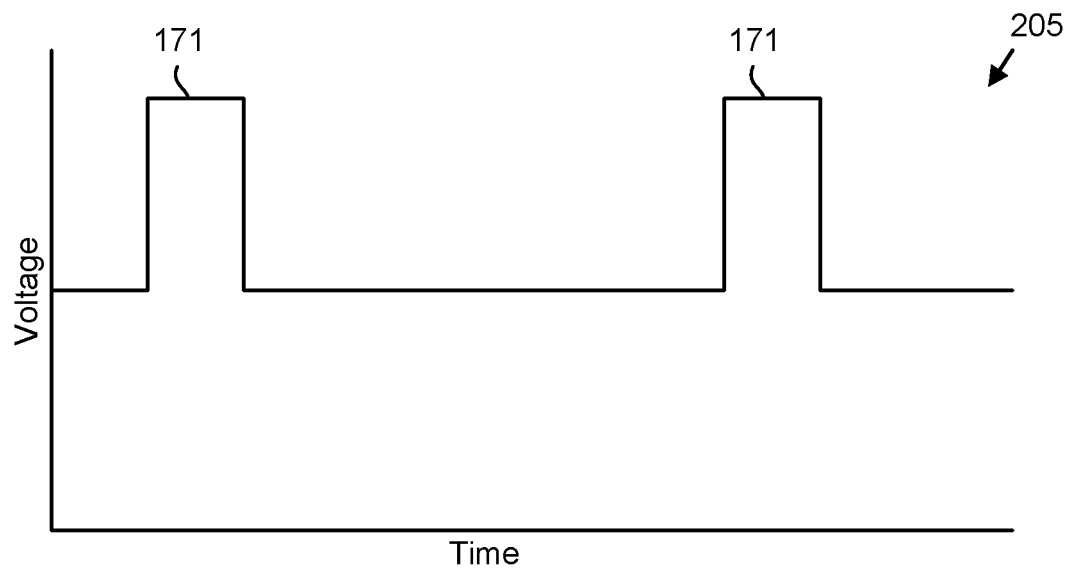
FIG. 3C is a graph of an initial voltage according to an alternate embodiment.

FIG. 3C is a graph of the initial voltage 205. In the depicted embodiment, the initial voltage 205 comprises a plurality of pulses 171 that are applied to the motor 101 to generate the initial flux map 201. Each of the plurality of pulses 171 has a constant voltage.

Figure 3D:
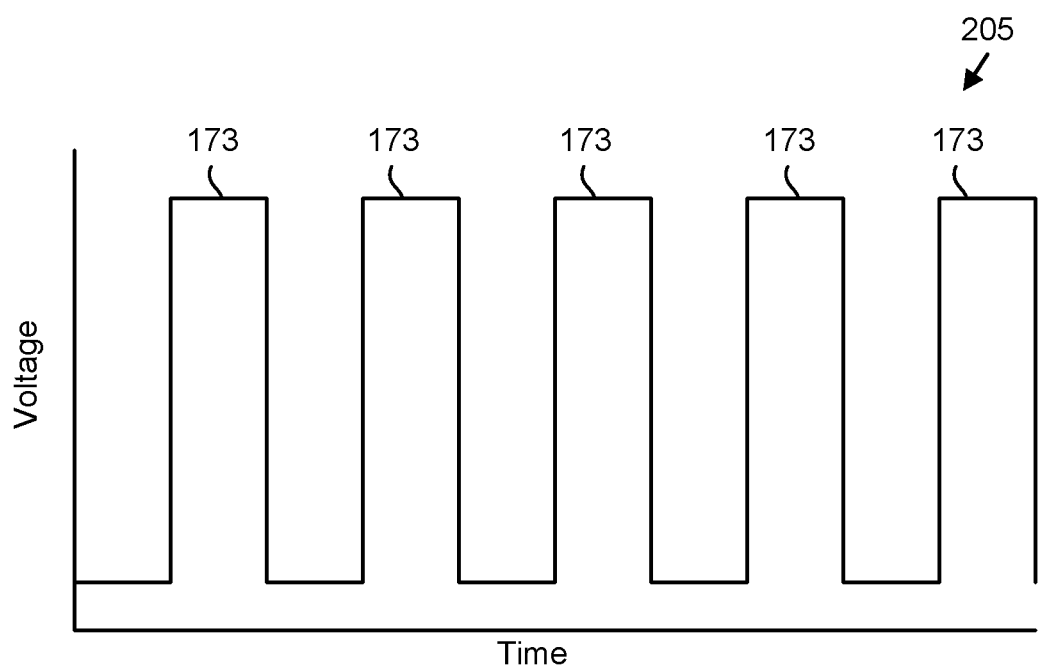
FIG. 3D is a graph of an initial voltage according to an alternate embodiment.

FIG. 3D is a graph of the initial voltage 205. In the depicted embodiment, the initial voltage comprises a plurality of hysteresis cycles 173. Each phase of the plurality of hysteresis cycles 173 has a constant voltage.

Figure 3E:
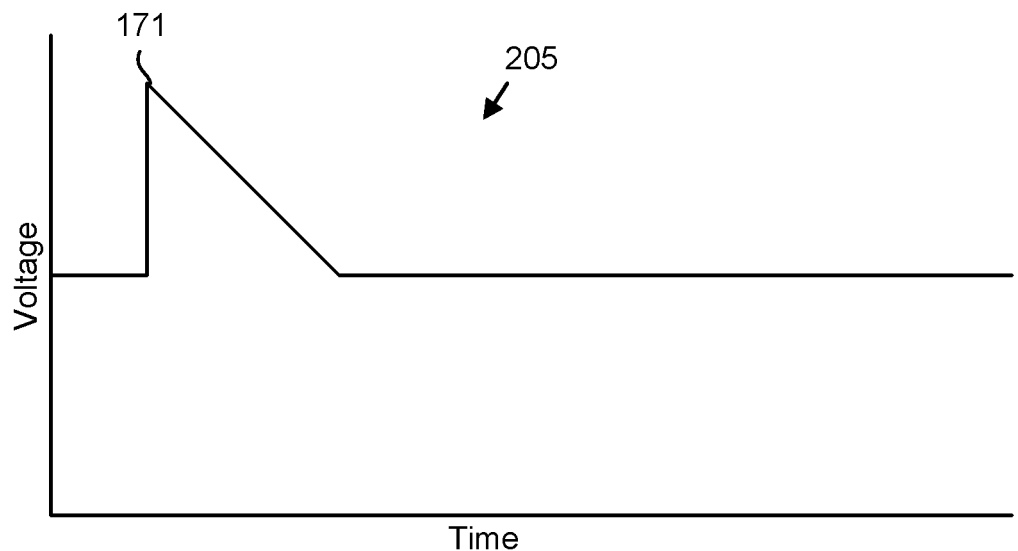
FIG. 3E is a graph of an initial voltage according to an alternate embodiment.

FIG. 3E is a graph of the initial voltage 205. In the depicted embodiment, the initial voltage 205 comprises at least one pulse 171. The at least one pulse 171 may have a varying voltage.

Figure 3F:
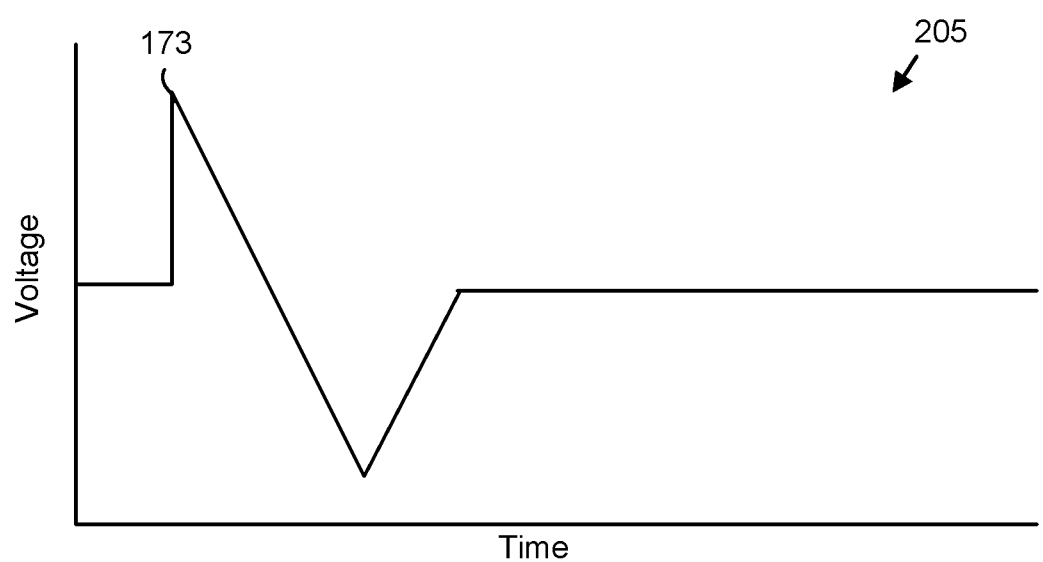
FIG. 3F is a graph of an initial voltage according to an alternate embodiment.

FIG. 3F is a graph of an initial voltage 205. In the depicted embodiment, the initial voltage 205 comprises at least one hysteresis cycle 173. Each phase of the hysteresis cycle 173 may have a varying voltage.

FIG. 4 is a schematic block diagram of the controller 150. In the depicted embodiment, the controller 150 includes a processor 405, a memory 410, and communication hardware 415. The memory 410 may store code. The processor 405 may execute the code. The communication hardware 415 may communicate with other devices.

Figure 5:
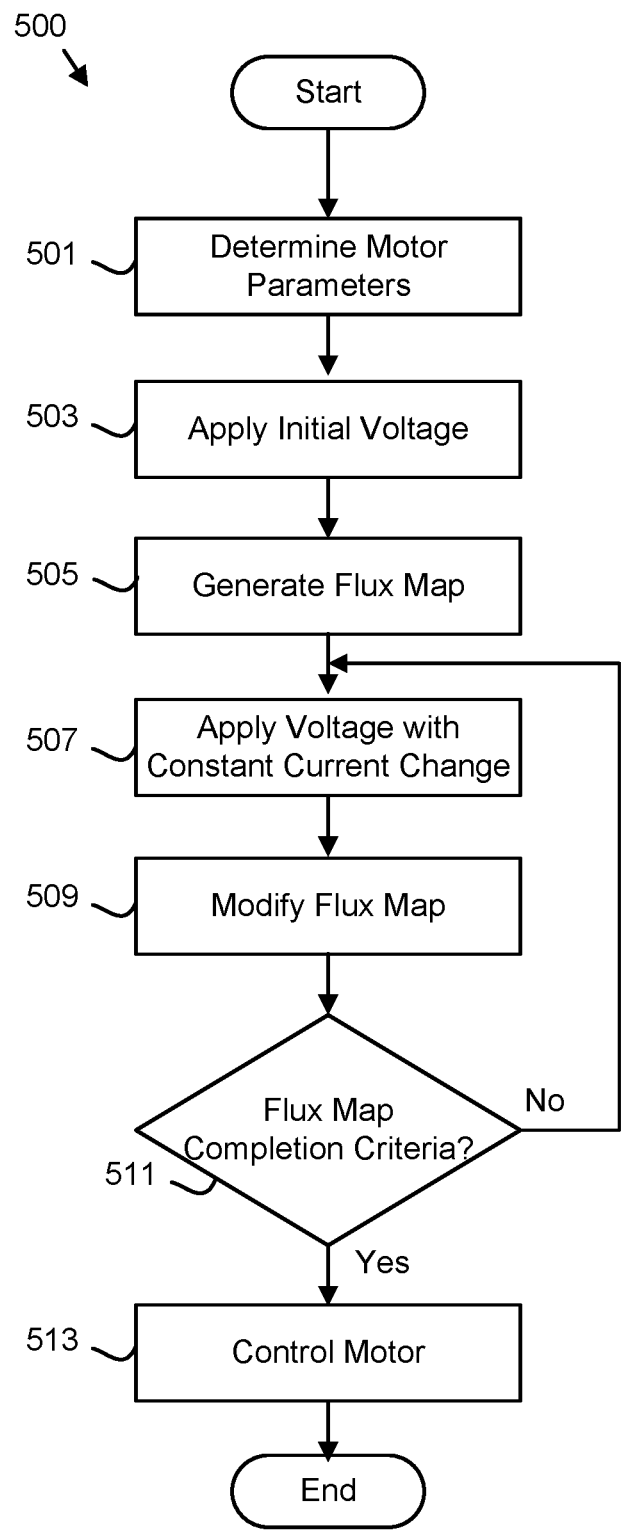
FIG. 5 is a schematic flow chart diagram of a flux identification method according to an embodiment.

FIG. 5 is a schematic flow chart diagram of a flux identification method 500. The method 500 may generate the flux map 201. In addition, the method 500 may control the motor 101 using the flux map 201. The method 500 may be performed by the processor 405.

The method 500 starts, and in one embodiment, the processor 405 determines 501 motor parameters. The motor parameters may include the rotor resistance 213. The motor parameters may be measured and/or downloaded.

The processor 405 may apply 503 the initial voltage 205 to the motor 101. The initial voltage 205 may be selected from the group consisting of at least one pulse 171 and at least one hysteresis cycle 173. The initial voltage 205 may be a constant voltage. Alternatively, the initial voltage 205 may be a variable voltage. The initial voltage 205 may not cause a shaft rotation of the rotor 105 of the motor 101.

The processor 405 may generate 505 the flux map 201 for the motor 101. The flux map 201 may be an initial flux 201 for iteration n=0. In one embodiment, the processor 405 measures the current 209 over a time interval for the initial voltage 205. The processor 405 may calculate the flux 215 for a plurality of current combinations. In one embodiment, the flux λ 215 is calculated using Equation 4, wherein V is the initial voltage 205, i is the current 209, and R is the rotor resistance 213.

$$\lambda = \int (V - iR) dt \quad \text{Equation 4}$$

The processor 405 may calculate the flux 215 for a plurality of Q-axis currents 209a and/or a D-axis currents 209b and organize the calculated flux 215 as the flux map 201. The flux map 201 will be improved and/or updated as will be described hereafter.

The processor 405 iteratively applies 507 the variable voltage 207 to the motor 101. The variable voltage 207 may have a constant current change 221 as calculated from the flux map 201. The variable voltage 207 may be selected from the group consisting of at least one pulse 171 and at least one hysteresis cycle 173. The variable voltage 207 may not cause a rotation of the rotor 105 of the motor 101.

A first variable voltage 207 is calculated from the initial flux map 201 and used to refine the initial flux map 201. Subsequent variable voltages 207 are calculated from the latest flux map 201 and used to refine the latest flux map 201. In one embodiment, the variable voltage $V_V$ 207 for iteration n+1 is calculated using Equation 5, wherein i is the current 209, R is the rotor resistance 213, $$\frac{d\lambda^n}{di}$$

is a change in flux $\lambda^n$ with respect to the change in current 209 from the nth flux map estimate 201, $$\frac{di}{dt}$$

is the current change 221 with respect to time. The current change $$\frac{di}{dt}$$

221 may be specified as a nonzero constant.

$$V_V = \frac{d\lambda^n}{di} \cdot \left(\frac{di}{dt}\right) + iR \quad \text{Equation 5}$$

The processor 405 iteratively modifies 509 the flux map 201 using Equation 4 based on the currents 209 measured while applying the variable voltage 207. As a result, each subsequent flux map 201 is updated and/or improved from previous versions.

The processor 405 may iteratively modify 509 the flux map 201 until the processor 405 determines 511 that the completion criteria 211 is satisfied. The completion criteria 211 may be selected from the group consisting of a convergence of flux map values and a specified number of iterations. If the completion criteria 211 is not satisfied, the processor 405 continues to iteratively apply 507 the variable voltage 207 and modify 509 the flux map 201.

If the completion criteria 211 is satisfied, the processor 405 may control 513 the motor 101 based on the final flux map 201 and the method 500 ends. The processor 405 may control 513 the motor 101 based on an inductance 219 determined from the flux map 201. In one embodiment, the inductance L 219 is calculated using Equation 6.

$$L = d\lambda di \quad \text{Equation 6}$$

In one embodiment, the motor 101 is controlled using the algorithm 203. The algorithm 203 may be selected from the group consisting of open-loop position tracking, current regulator tuning, and torque calculation.

Figure 6A:
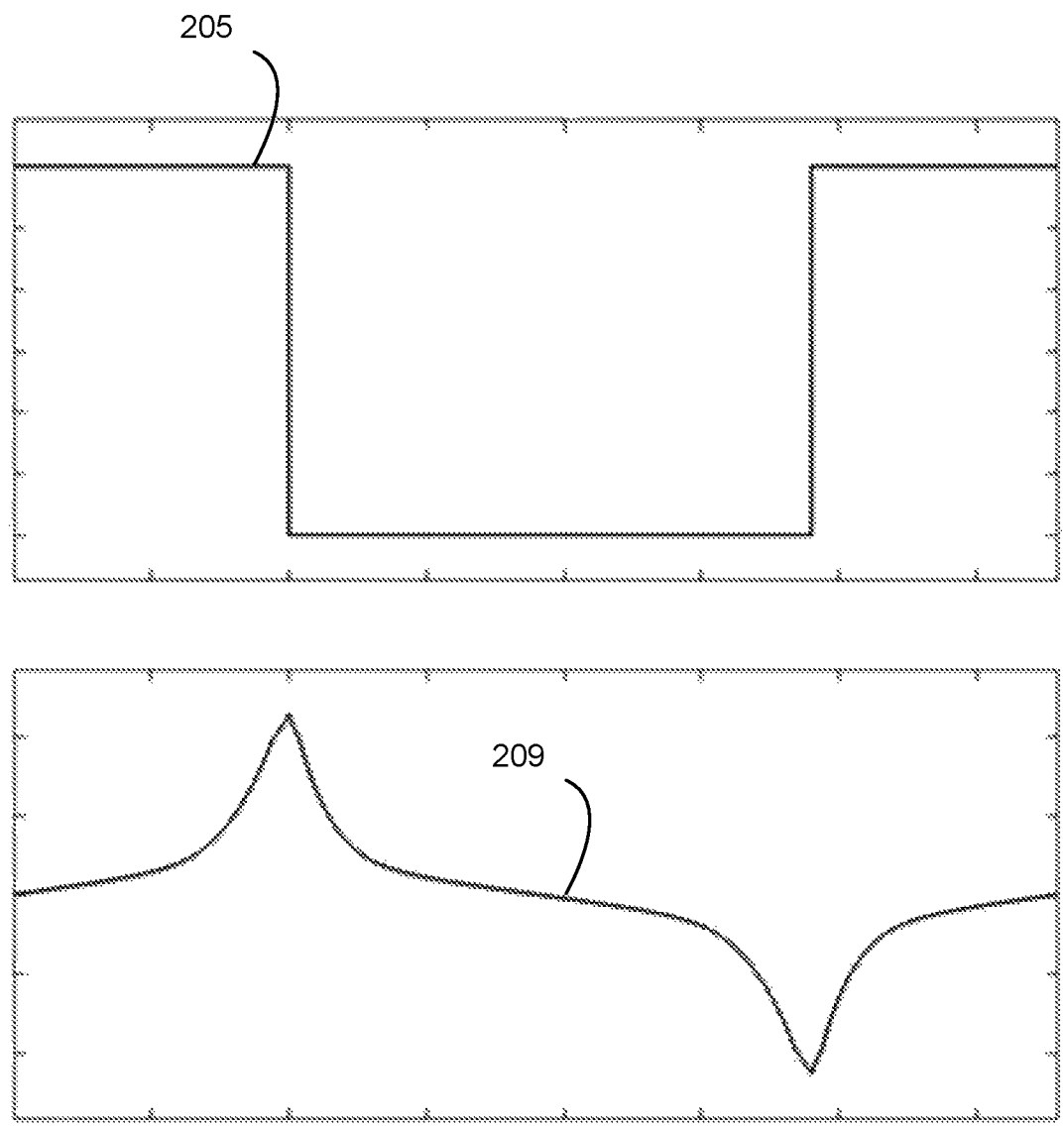
FIG. 6A is graphs of an initial voltage and corresponding current according to an embodiment.

FIG. 6A is graphs of an initial voltage 205 and corresponding current 209. In the depicted embodiment, the initial voltage 205 is a hysteresis cycle 173 with a constant voltage. In response to applying the initial voltage 205 to the motor 101, the current 209 is measured. The depicted current change $$\frac{di}{dt}$$

221 of the current 209 is highly variable. The initial flux map 201 may be generated for the rotor 105 based on the current 209 using Equation 4.

Figure 6B:
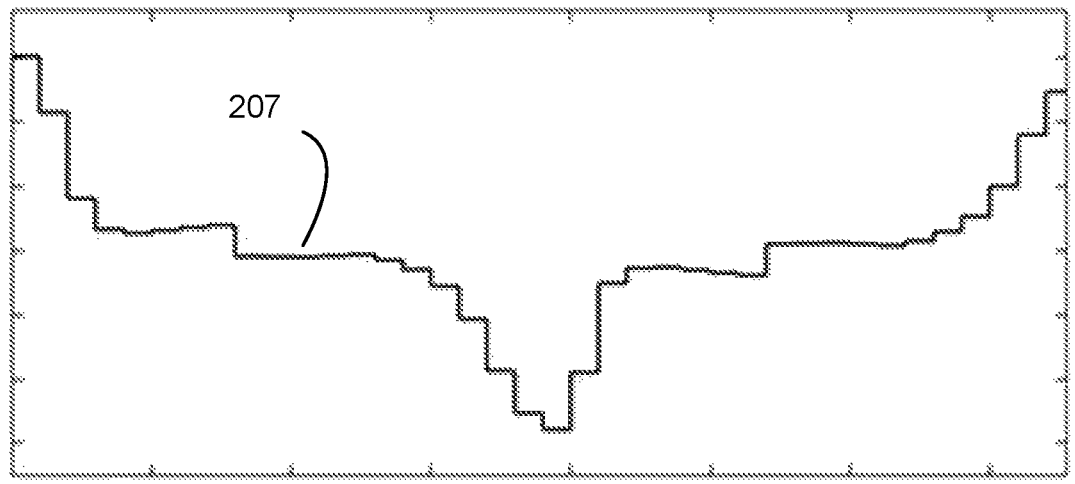
FIG. 6B is graphs of a variable voltage and corresponding current according to an embodiment.
Figure 6B:
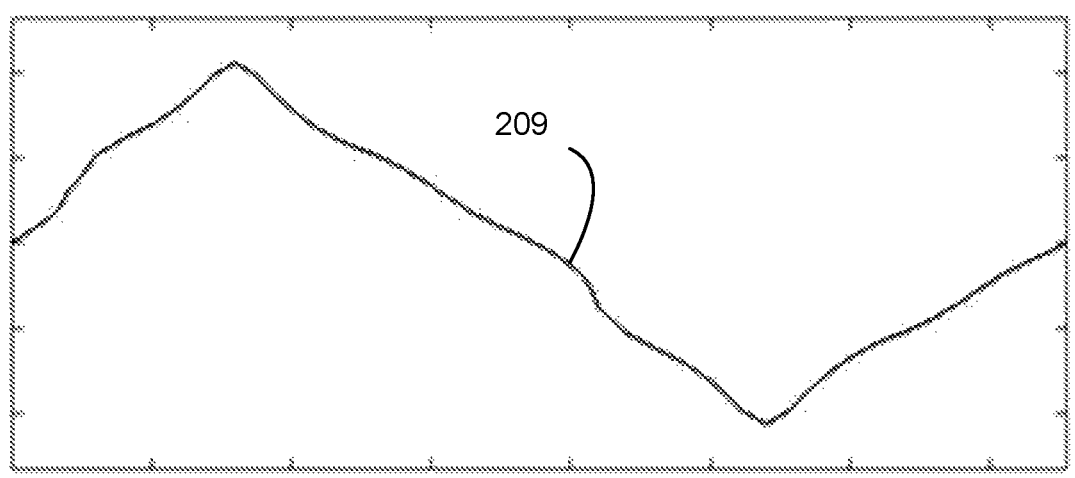

FIG. 6B is graphs of a variable voltage 207 and corresponding current 209. In the depicted embodiment, the initial flux map 201 generated from the initial voltage 205 and the corresponding current 209 of FIG. 6A is used to determine the variable voltage 207. As a result, the current change $$\frac{di}{dt}$$

221 of the current 209 is more constant than in FIG. 6A as shown by the more linear slope, improving measurement of the flux 215. Iteratively modifying the flux map 201 and applying a recalculated variable voltage 207 based on the modified flux map 201 results in an increasingly constant current change $$\frac{di}{dt}$$

221 and in an increasingly accurate flux map 201.

Figure 6C:
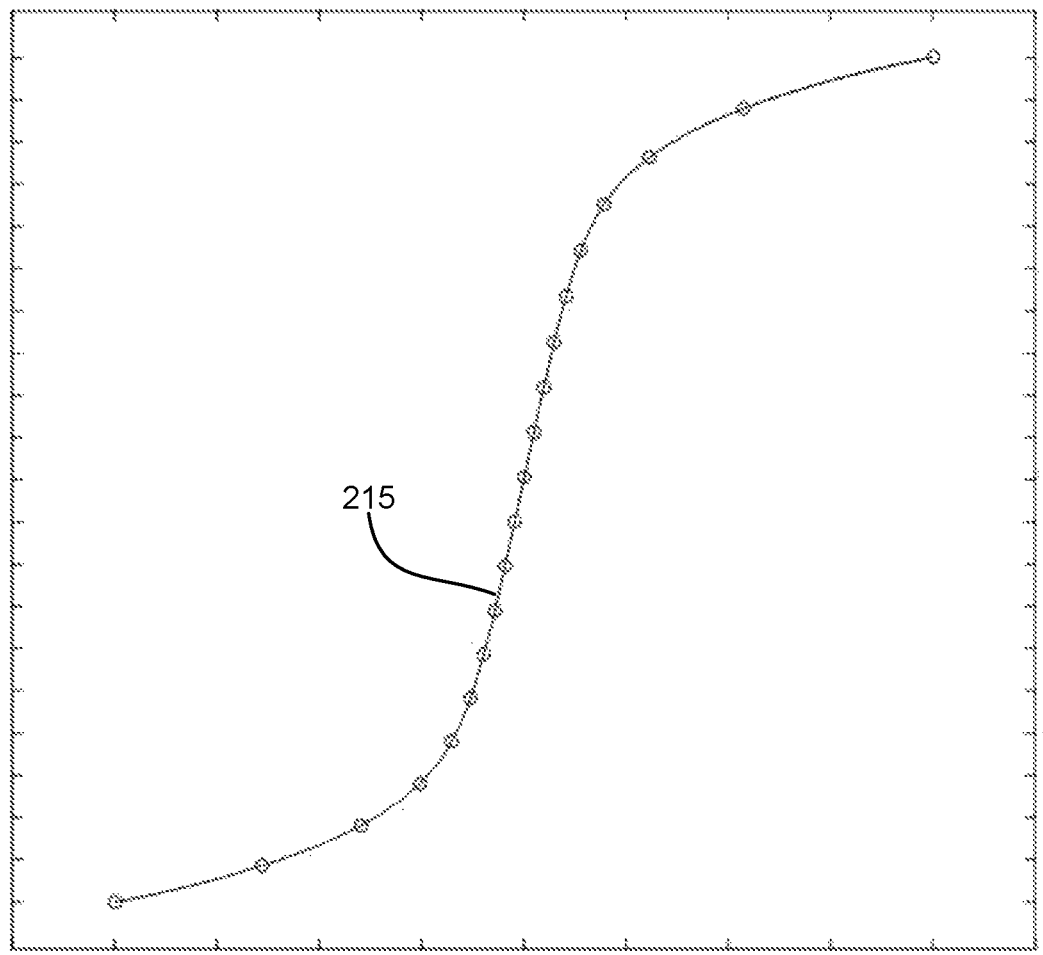
FIG. 6C is a graph of flux according to an embodiment.

FIG. 6C is a graph of flux 215. In the depicted embodiment, the flux 215 is measured for a typical pulse 171 and/or hysteresis cycle 173. The resulting samples of flux 215 are concentrated around currents 209 of 0+/−5 Amps. As a result, fewer samples of flux 215 are available for larger currents 209. A flux map 201 generated from the depicted samples would be less accurate for currents 209 greater than +/−5 Amps.

Figure 6D:
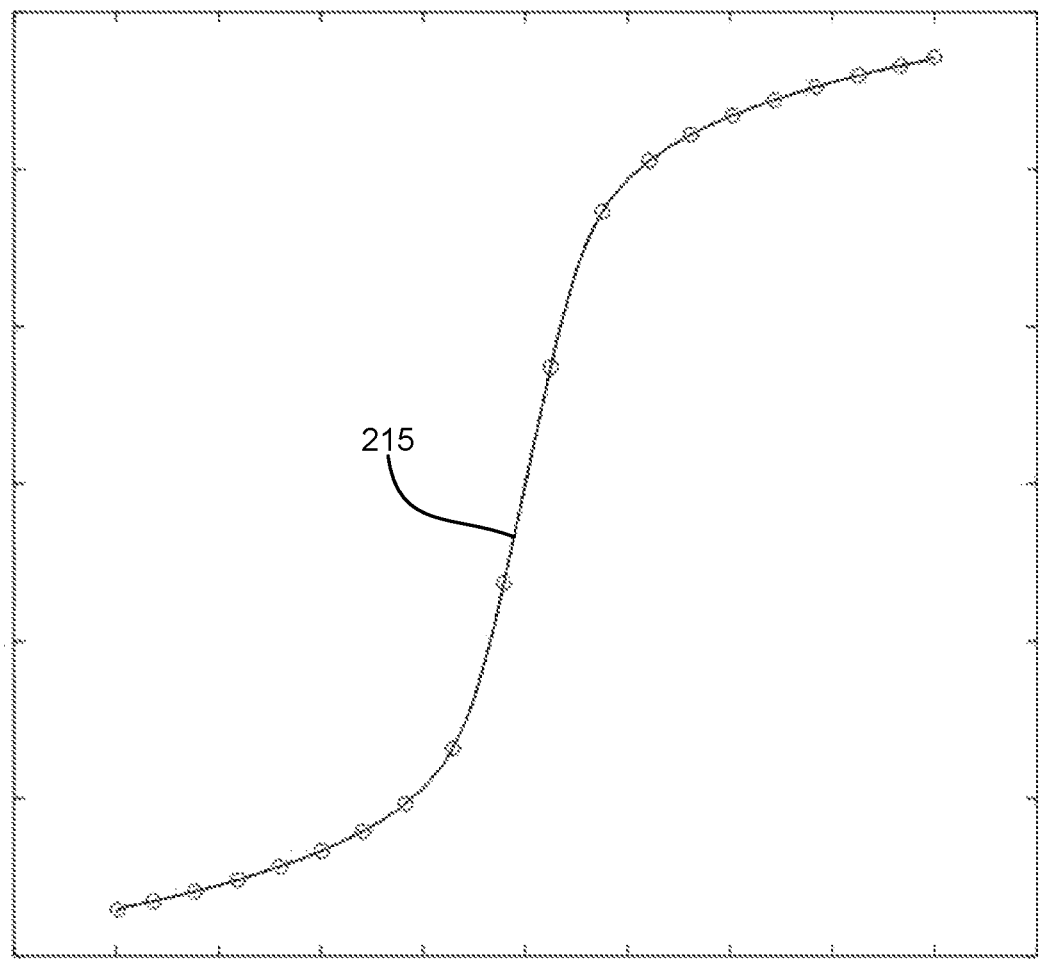
FIG. 6D is a graph of flux according to an embodiment.

FIG. 6D is a graph of flux 215 measured with a variable voltage 207. In the depicted embodiment, samples of flux 215 are more evenly distributed across the range of currents 209 than in FIG. 6C. As a result, the flux map 201 generated from the flux 215 is more accurate over the range of currents 209 for the motor 101. Thus, the motor 101 may be controlled using the flux map 201 with greater accuracy and efficiency.

Problem/Solution

High-performance control of the salient motor 101 requires an accurate quantification of flux 215 in the rotor 105. Accurate torque calculation for the salient motor 101 also requires accurate mapping of the flux 215. In the past, flux mapping methods have generated flux maps 201 that are insufficient for high-performance control and/or accurate torque calculation.

The embodiments apply the initial voltage 205 to the motor 101 to generate the initial flux map 201 for the rotor 105. However, the embodiments further iteratively apply the variable voltage 207 with constant current change 221 calculated from a previous flux map 201. Because each iteration of flux map 201 is more accurate, the estimate of constant current change 221 derived from the flux map 201 is also more accurate. As a result, the current change $$\frac{di}{dt}$$

221 becomes increasingly constant, improving the calculation of the flux 215 using Equation 4. Thus, the flux map 201 is improved and control of the motor 101 is enhanced.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
applying, by use of a processor, an initial voltage to a motor, wherein the motor is a salient motor;
generating a Q-axis flux map yielding the Q-axis flux for a Q-axis current and a D-axis current for the motor;
iteratively applying a variable voltage to the motor, wherein the variable voltage is based on a change in flux that increases each iteration and a constant current change calculated from the flux map; and
iteratively modifying the flux map based on the Q-axis current and the D-axis current measured while applying the variable voltage.

2. The method of claim 1, wherein the variable voltage V for iteration n+1 is calculated as $$V = \frac{d\lambda^n}{di} \cdot \left(\frac{di}{dt}\right) + iR,$$

where i is a current, R is a rotor resistance, $$\frac{d\lambda^n}{di}$$

is a change in flux $\lambda^n$ with respect to the change in current from the nth flux map estimate, $$\frac{di}{dt}$$

is a current change with respect to time and is specified as a nonzero constant.

3. The method of claim 1, wherein the initial voltage and the variable voltage are selected from the group consisting at least one pulse and at least one hysteresis cycle.

4. The method of claim 1, wherein the flux map is iteratively modified until a completion criteria is satisfied, the completion criteria selected from the group consisting of a convergence of flux map values and a specified number of iterations.

5. The method of claim 1, the method further comprising controlling the motor based on the flux map.

6. The method of claim 5, wherein the motor is controlled using an algorithm selected from the group consisting of open-loop position tracking, current regulator tuning, and torque calculation.

7. The method of claim 1, wherein the initial voltage and/or the variable voltage do not cause a shaft rotation of the motor.

8. An apparatus comprising:
a processor;
a memory storing code executable by the processor to perform:
applying an initial voltage to a motor, wherein the motor is a salient motor;
generating a Q-axis flux map yielding the Q-axis flux for a Q-axis current and a D-axis current for the motor;
iteratively applying a variable voltage to the motor, wherein the variable voltage is based on a change in flux that increases each iteration and a constant current change calculated from the flux map; and
iteratively modifying the flux map based on the Q-axis current and the D-axis current measured while applying the variable voltage.

9. The apparatus of claim 8, wherein the variable voltage V for iteration n+1 is calculated as $$V = \frac{d\lambda^n}{di} \cdot \left(\frac{di}{dt}\right) + iR,$$

where i is a current, R is a rotor resistance, $$\frac{d\lambda^n}{di}$$

is a change in flux $\lambda^n$ with respect to the change in current from the nth flux map estimate, $$\frac{di}{dt}$$

is a current change with respect to time and is specified as a nonzero constant.

10. The apparatus of claim 8, wherein the initial voltage and the variable voltage are selected from the group consisting at least one pulse and at least one hysteresis cycle.

11. The apparatus of claim 8, wherein the flux map is iteratively modified until a completion criteria is satisfied, the completion criteria selected from the group consisting of a convergence of flux map values and a specified number of iterations.

12. The apparatus of claim 8, the processor further controlling the motor based on the flux map.

13. The apparatus of claim 12, wherein the motor is controlled using an algorithm selected from the group consisting of open-loop position tracking, current regulator tuning, and torque calculation.

14. The apparatus of claim 8, wherein the initial voltage and/or the variable voltage do not cause a shaft rotation of the motor.

15. A computer program product comprising a non-transitory computer readable storage medium having program code embodied therein, the program code readable/executable by a processor to perform:
    applying an initial voltage to a motor, wherein the motor is a salient motor;
    generating a Q-axis flux map yielding the Q-axis flux for a Q-axis current and a D-axis current for the motor;
    iteratively applying a variable voltage to the motor, wherein the variable voltage is based on a change in flux that increases each iteration and a constant current change calculated from the flux map; and
    iteratively modifying the flux map based on the Q-axis current and the D-axis current measured while applying the variable voltage.

16. The computer program product of claim 15, wherein the variable voltage V for iteration n+1 is calculated as $$V = \frac{d\lambda^n}{di} \cdot \left(\frac{di}{dt}\right) + iR,$$

where i is a current, R is a rotor resistance, $$\frac{d\lambda^n}{di}$$

is a change in flux $\lambda^n$ with respect to the change in current from the nth flux map estimate, $$\frac{di}{dt}$$

is a current change with respect to time and is specified as a nonzero constant.

17. The computer program product of claim 15, wherein the initial voltage and the variable voltage are selected from the group consisting at least one pulse and at least one hysteresis cycle.

18. The computer program product of claim 15, wherein the flux map is iteratively modified until a completion criteria is satisfied, the completion criteria selected from the group consisting of a convergence of flux map values and a specified number of iterations.

19. The computer program product of claim 15, the processor further controlling the motor based on the flux map.

20. The computer program product of claim 19, wherein the motor is controlled using an algorithm selected from the group consisting of open-loop position tracking, current regulator tuning, and torque calculation.

\* \* \* \* \*